E. JONES.
LOCK WASHER.
APPLICATION FILED OCT. 14, 1916.
1,228,679.
Patented June 5, 1917.
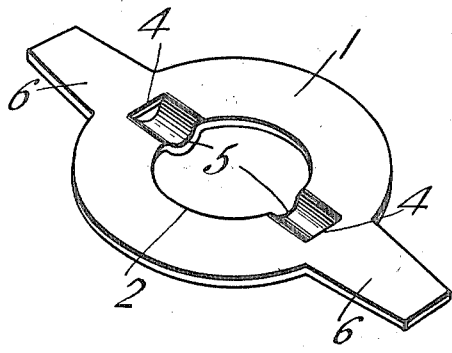
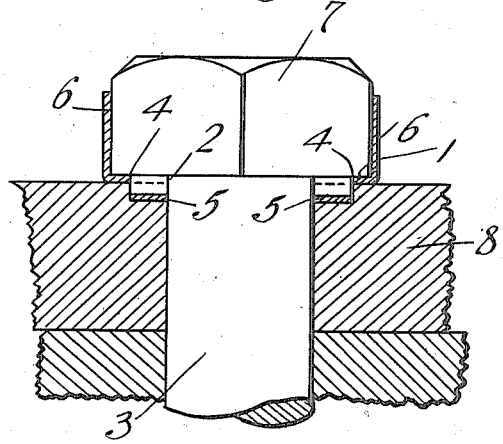
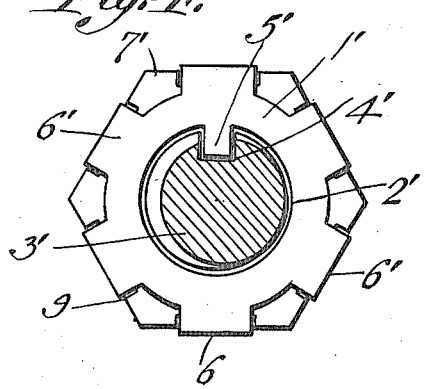
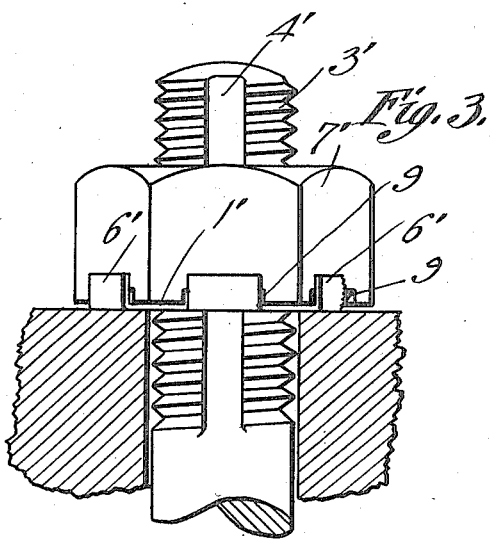
E. Jones
Inventor

UNITED STATES PATENT OFFICE.

ELI JONES, OF LEXINGTON, TENNESSEE, ASSIGNOR OF ONE-HALF TO ROBERT A. LEWIS, OF LEXINGTON, TENNESSEE.

LOCK-WASHER.

1,228,679. Specification of Letters Patent. Patented June 5, 1917.

Application filed October 14, 1916. Serial No. 125,679.

*To all whom it may concern:*

Be it known that I, ELI JONES, a citizen of the United States, residing at Lexington, in the county of Henderson and State of Tennessee, have invented a new and useful Lock-Washer, of which the following is a specification.

The present invention appertains to lock washers, and aims to provide a simple and inexpensive yet practical and effective washer applicable to a bolt and having means for engaging the bolt head or nut for preventing the accidental rotation thereof.

With the foregoing and other objects in view, which will appear as the invention is better understood, the invention resides in the novel formation of the washer as hereinafter described, it being understood that slight changes in details can be made, within the scope of the appended claim, without departing from the spirit of the invention.

The invention is illustrated in the accompanying drawing, wherein:—

Figure 1 is a perspective view of one form of washer.

Fig. 2 is a diametrical section thereof, as applied to the head of a bolt.

Fig. 3 is a side elevation of a second form of the invention, a portion being broken away and the washer being applied to a nut.

Fig. 4 is a plan view of the second form of washer showing it applied to the bolt and nut.

The washer 1 illustrated in Figs. 1 and 2, is constructed of suitable sheet metal, and is of circular form, being provided with the circular aperture 2 for the reception of the bolt 3. The washer 1 is provided between its inner and outer edges and at diametrically opposite points with chordal slits 4, and those portions of the washer 1 between the slits 4 and inner edge of the washer are struck to one side, to provide radial diametrically opposite alining corrugations 5 which are relatively stiff and which form teeth or spurs projecting from one side of the washer. The washer 1 is provided with diametrically opposite tongues 6 projecting from its outer edge in alinement with the corrugations 5, and the basal portions of the tongues 6 are wider than the length of the slits 4, whereby the tongues 6 strengthen the portions weakened by the slits 4 and corrugations or outstruck portions 5. The tongues 6 are bendable, and are normally in the plane of the washer 1. The washer can be readily punched from sheet metal, and can be slipped upon the shank of the bolt 3 before the bolt is applied to the object 7, whereby the washer is clamped between the head 7 of the bolt and the object 8. When the bolt is tightened, the corrugations or teeth 5 will be forced into the object, thereby preventing the rotation of the washer relative to the object, and the tongues 6 being bent at an angle with the washer against opposite sides of the bolt head 7, will prevent the accidental rotation of the bolt. The washer can also be used for holding a nut against rotation relative to the object, in the same manner that it holds the bolt head.

The washer 1 can be provided with any suitable number of the radial tongues 6, but two will be sufficient for ordinary use.

The washer 1' illustrated in Figs. 3 and 4 is of sheet metal, and has an aperture 2' for receiving the bolt 3', the washer having a lug 5' projecting inwardly from its inner edge to enter a longitudinal groove 4' with which the bolt is provided, whereby to prevent the rotation of the washer relative to the bolt. The washer has a plurality, in this case six, of radial tongues 6' projecting from its outer edge to engage the six sides of a hexagonal nut 7', said tongues 6' being bendable against the sides of the nut, as seen in Fig. 3. It is preferable and advantageous although not compulsory to provide the inner corners of the nut between the several sides thereof and the inner face of the nut, with chamfered notches 9 for receiving the tongues 6' when bent against the sides of the nut. The chamfered notches 9 can also be used upon the bolt head 7 with the first form of washer, to better resist the turning movement of the bolt head.

Having thus described the invention, what is claimed as new is:

A lock washer having diametrically opposite slits between its inner and outer edges, the portions between said slits and inner edge being struck to one side to provide corrugations to engage an object, the washer having diametrically opposite bendable tongues projecting radially from its outer edge in alinement with the corrugations, the basal portions of said tongues being wider than the lengths of said slits.

In testimony that I claim the foregoing as my own, I have hereto affixed my signature in the presence of two witnesses.

ELI JONES.

Witnesses:
S. M. BENNET,
S. F. PAGE.